UNITED STATES PATENT OFFICE 2,106,952

PROCESS OF PRODUCING ANHYDROUS ALKALI METAL SULPHIDES

Hermann Theodor Joseph König, Dordrecht, Netherlands, assignor to N. V. Stikstofbindingsindustrie "Nederland", a company of the Netherlands No Drawing. Application December 27, 1933, Serial No. 704,209. In Germany December 28, 1932

14 Claims. (Cl. 23—134)

It is known to make alkali metal sulphides from impure alkali metal sulphates by means of coal or reducing gases such as carbon monoxide, hydrogen, watergas or hydrocarbons, mixed with sulphur compounds.

All of the sulphides obtained according to these processes are more or less contaminated by undesirable salts, such as sodium hydrosulphide, sodium polysulphide, sodium carbonate, sodium sulphate, sodium thiosulphate, sodium sulphite and sodium hydroxide, and they contain in recrystallized condition considerable amounts of water of crystallization and are marketed molten in the latter.

In devising a method of making an anhydrous, pure sodium sulphide of arbitrary granular dimensions it has been found that high grade anhydrous alkali metal sulphides which are free from oxidic compounds may be made in a simple manner by causing hydrogen sulphide or carbon oxysulphide in presence of reducing or inert gases such as carbon monoxide, hydrogen, methane or nitrogen, or of mixtures of these gases, to react on alkali metal carbonates or on alkali metal hydroxide containing carbonates at temperatures ranging from 500–800° C. Accordingly, by causing a gas mixture consisting of 90% by volume of hydrogen and 10% by volume of hydrogen sulphide to pass at 650° C. over e. g. briquettes of sodium carbonate while maintaining the salt mass in a solid state, a sodium sulphide briquette containing 99% $Na_2S$ is obtained with practically complete transformation of the hydrogen sulphide.

The principal reactions on which the obtention of high grade alkali metal sulphides such as sodium sulphide is based, take place at elevated temperatures according to the following chemical equilibriums:

I. $Na_2CO_3 + H_2S \rightleftarrows Na_2S + CO_2 + H_2O$
II. $Na_2CO_3 + COS \rightleftarrows Na_2S + 2CO_2$.

In this process the following secondary reactions must be prevented:

1. $Na_2S + H_2S = 2NaSH$
2. $Na_2S + H_2S = Na_2S_2 + H_2$
3. $Na_2S + 3H_2O = Na_2SO_3 + 3H_2$
4. $Na_2S + 3CO_2 = Na_2SO_3 + 3CO$
5. $4Na_2SO_3 = Na_2S + 3Na_2SO_4$.

In order to avoid a possible formation of polysulphides, hydrosulphides, sulphites, thiosulphates and sulphates according to the above equations, the hydrogen sulphide is caused to react on the heated alkali metal carbonates while being diluted with reducing or inert gases.

The diluting of the hydrogen sulphide inhibits the formation of hydrosulphides and polysulphides, whereas reducing gases inhibit the formation of sulphites, thiosulphates and sulphates.

If it is desired to have the hydrogen sulphide react solely in the presence of inert gases such as nitrogen, it is necessary to bring about the transformation at temperatures which are as low as possible—preferably ranging between 400 and 550° C.—and to keep the partial pressure of the hydrogen sulphide lower or to work under reduced pressure, so as to prevent the formation of oxidic salts and of hydrosulphides, or polysulphides.

Hydrogen, carbon monoxide or mixtures of these gases may advantageously be used as reducing gases because said gases are able to influence favorably the chemical equilibriums according to the principal and secondary reactions stated above. Thus, by using a gas mixture consisting of carbon monoxide and hydrogen sulphide, sodium sulphide is formed according to the following equations:

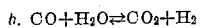
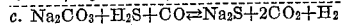

a. $Na_2CO_3 + H_2S \rightleftarrows Na_2S + CO_2 + H_2O$
b. $CO + H_2O \rightleftarrows CO_2 + H_2$
c. $Na_2CO_3 + H_2S + CO \rightleftarrows Na_2S + 2CO_2 + H_2$ This shows that the equilibrium $b$ strongly influences the chemical equilibrium $a$ in the sense of the equilibrium $c$, which at the temperatures in question practically irreversibly passes to the right.

Similar conditions prevail when hydrogen is used. In this case the secondary reaction

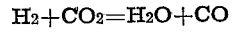

$$H_2 + CO_2 = H_2O + CO$$

occurs in consequence of which sodium sulphide is formed according to the equations:

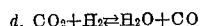
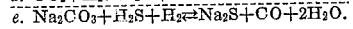

a. $Na_2CO_3 + H_2S \rightleftarrows Na_2S + CO_2 + H_2O$
d. $CO_2 + H_2 \rightleftarrows H_2O + CO$
e. $Na_2CO_3 + H_2S + H_2 \rightleftarrows Na_2S + CO + 2H_2O$.

The secondary reaction $d$ being promoted by elevation of temperature, the hydrogen may be caused to react preferably at elevated temperatures, whereas it is preferred to use carbon monoxide at lower temperatures as an auxiliary reagent.

The above mentioned secondary reactions brought about by means of carbon monoxide or hydrogen are in their turn determined by chemical equilibriums. Therefore, an excess of the said gases with respect to hydrogen sulphide is necessary to yield a favorable effect. This measure too implies considerable diluting of the hydrogen sulphide, so that practically gas mixtures with 5 to 15% of H₂S are used.

This high partial pressure of the reducing so-called auxiliary gas ensures at the same time that polysulphides and hydrosulphides of the alkalis are not formed and moreover prevents the formation of sulphites, thiosulphates and sulphates.

If larger concentrations of hydrogen sulphide are used sulphhydrates may be formed according to the equation $$Na_2S + H_2S = 2NaSH$$

so that mixtures of sulphide and hydrosulphide are obtained which will cause melting of the reaction mass. The latter may be removed, however, by an after treatment with inert or reducing gases, having only a small content or no hydrogen sulphide.

In lieu of hydrogen and carbon monoxide mixtures of these gases may also be used. This of course influences unfavorably the following reactions which practically pass to the right:

$$Na_2CO_3 + H_2S + CO \rightleftharpoons Na_2S + H_2 + 2CO_2$$

$$Na_2CO_3 + H_2S + H_2 \rightleftharpoons Na_2S + CO + 2H_2O$$

and at a determined proportion between the percentages of hydrogen and carbon monoxide in the mixture of these two gases the secondary reactions which occasion a more complete transformation of the hydrogen, must wholly fail, so that merely remains the chemical equilibrium:

$$Na_2CO_3 + H_2S \rightleftharpoons Na_2S + CO_2 + H_2O$$

This state of things is brought about by passing e. g. hydrogen mixed with hydrogen sulphide over heated soda briquettes and by reusing the exhaust gas after having liberated it from its contents of carbon dioxide and water. In this cycle the hydrogen is substituted in an increasing proportion by carbon monoxide which phenomenon continues until the partial pressure of the carbon monoxide has attained a definite value. At 600° C. e. g. the proportion CO:H₂=0.38 is attained.

The transformations of the hydrogen sulphide which are brought about at 600° C. when using such a gas mixture amount to 90–95%.

The above considerations show that the obtaining of a high grade alkali metal sulphide implies the necessity that each alkali metal carbonate particle reacting with hydrogen sulphide must be surrounded by an excess of reducing or inert gases.

The gas mixture which remains after the reaction may be used again after complete or partial elimination of the carbon dioxide and the water it contains, which is effected either by refrigeration or by absorption or by chemical fixation. It appears herefrom that moist or carbon dioxide containing gases may also be used provided they contain amounts of carbon monoxide and hydrogen, sufficient to ensure the prevention of oxidations. For obtaining white or light rose coloured sulphides the presence of definite quantities of carbondioxide or water vapour or mixtures of both is advantageous, because they prevent a possible deposition of carbon, which would cause a bad coloured product.

The gas mixture can be caused to react at atmospheric pressure as well as under elevated pressures, or under subatmospheric pressure. In this latter case it is possible to lower the temperatures if necessary and to increase the partial pressure of the hydrogen sulphide, so that it is practically possible to use gases which contain 15 to 25% by volume of hydrogen sulphide.

For the purpose of the invention in the first place technical gas mixtures are used, containing hydrogen sulphide and reducing gases, which may be used directly. If such gases contain detrimental constituents, such as oxygen, sulphurdioxide, too much carbonic acid, too much water or ammonia, the hydrogen sulphide should be removed therefrom in known manner, for instance by absorption in calcium hydroxide, from which it is afterwards liberated in a purified condition to be used in the process of making sodium sulphide.

Possibly also the addition of reducing gases, such as water gas, to a gas containing too much hydrogen sulphide and therefore not suitable for the conversion reaction, may cause the new gas mixture to become suitable therefor.

Other sources of hydrogen sulphide are the sulphides of alkaline earth metals or impure sulphides of alkali metals, from which in aqueous solution or at elevated temperatures by the action of carbon dioxide and water or gases containing same—for instance the spent gases of the sodium sulphide factory—hydrogen sulphide may be obtained according to the equations $$K_2S + CO_2 + H_2O = K_2CO_3 + H_2S$$

$$BaS + CO_2 + H_2O = BaCO_3 + H_2S$$

Also the sulphides and disulphides of heavy metals are suitable for the production of hydrogensulphide. For instance iron sulphide reacts with water vapour at elevated temperatures according to the equation $$3FeS + 4H_2O = Fe_3O_4 + 3H_2S + H_2$$

and sulphurous pyrite may be converted by water and hydrogen according to $$3FeS_2 + 4H_2O + 2H_2 = Fe_3O_4 + 6H_2S$$

Instead of hydrogen sulphide its formation components such as hydrogen or hydrocarbons and sulphur vapor, or carbon oxysulphide or sulphur dioxide mixed with hydrogen may also be used in presence of an excess of reducing gases.

As the gases of distillation—or cracking of the petroleum industry as also the gases obtained by a low temperature distillation of coal and bituminous substances contain considerable amounts of H₂S or contain substances capable of forming H₂S, such as mercaptans, these gases are also suitable for the production of alkali metal sulphides according to the present process.

The above described measures self-evidently permit also of increasing the sulphide contents of alkali metal sulphides contaminated with alkali metal carbonates or alkali metal hydroxides, which sulphides are obtained by reducing alkali metal sulphates by means of carbon, coal or reducing gases, and consequently of enhancing their grade and of obtaining them in a more pure condition. Accordingly, if a gas mixture consisting of 90% by volume of hydrogen and 10% by volume of hydrogen sulphide is caused to pass at 600° C. over sodium sulphide which has been produced from sodium sulphate and carbon, for instance in a rotary furnace, the alkali metals present in the shape of carbonate and hydroxide are equally transformed into sodium sulphide.

*Example 1*

25 kilos of soda in the shape of briquettes or agglomerates of arbitrary granular dimensions are heated in a sillimannite retort at 650° C. and subsequently treated with a gas mixture consisting of 90% by volume of hydrogen and 10% by volume of hydrogen sulphide. Under these conditions 936 litres of hydrogen and 104 litres of hydrogen sulphide are passed each minute over the briquettes which treatment is continued during an hour. After the reaction has been completed 18 kilos of sodium sulphide are obtained in the form of briquettes having a purity of 98–100% of $Na_2S$.

Example 2

A gas mixture consisting in the beginning of 7.5% by volume $H_2S$ and 92.5% by volume $H_2$ is caused to react on 300 ccm.=210 g. briquettes of sodium carbonate at a temperature of 600° C. The spent gas of this reaction which, besides carbon dioxide and water vapour, contains also carbon monoxide—formed from $CO_2$ and $H_2$—is cooled for removing the water and afterwards conducted through a sludge of calcium hydroxide and water to remove carbon dioxide. Thereby a gas mixture is obtained containing hydrogen and carbon monoxide, which is returned to the furnace after having been provided with hydrogen sulphide and reacts again.

After having been completely freed from $CO_2$ and $H_2O$ the mixture of reducing gases, after a further addition of $H_2S$ is again returned to the sodium sulphide furnace; after a repeated circulation of the gases in which the CO content continually increases at the expense of the hydrogen, finally a proportion is reached of $CO:H_2=0.38$. The so obtained proportion $CO:H_2$ in the gas mixture remains the same in further conversions of hydrogen sulphide, so that only carbon dioxide and water vapour are now formed which must be removed as explained.

The reaction is continued for 5 hours in such manner that every minute 180 ccm. $H_2S$ besides 2220 ccm. of the hydrogen-carbon monoxide mixture is caused to react on the sodium carbonate. After this action 154 g. high percentage sodium sulphide are obtained with 98–100% $Na_2S$.

Example 3

400 ccm.=280 g. briquettes of sodium carbonate with a section of 4 mm. and a length of 6 mm. are placed in a tube of sillimannite to a height of 40 cm. and treated at 600° C. with a hydrogen sulphide containing gas of the following composition

|  | Per cent |
|---|---|
| Hydrogen sulphide | 7 |
| Hydrogen | 58 |
| Carbon monoxide | 15 |
| Methane | 7 |
| Carbon dioxide | 5 |
| Nitrogen | 5 |
| Water vapour | 3 |
|  | 100 |

The action of the gas is continued until the spent gases of the furnace have the same percentage of hydrogen sulphide as the gases entering the furnace which shows that the conversion is completed. The then obtained sodium sulphide has a purity of 98–100% $Na_2S$.

Example 4

Gases obtained by the distillation of crude mineral oil containing for instance 25% $H_2S$ besides 8% $CO_2$ and 66% other gases are first mixed with water purified gas in the proportion 1:1 or 1:2 and then carried at 600° C. over agglomerates of sodium carbonate of the size of a pea, hydrogen sulphide reacts with the soda ash with formation of high percentage sodium sulphide, carbon dioxide and water. The action of the gas is continued until all the soda ash is converted.

Example 5

A mixture of 25 parts comminuted anthracite and 75 parts of sodium sulphate are agglomerated; 300 g. of the so obtained product are heated in a sillimannite tube at regularly increasing temperature to 750° C., while simultaneously carbon monoxide is conducted through the tube until the spent gases do no more contain any carbon dioxide. Thereby a reaction product is obtained which contains 65% $Na_2S$ besides 18% of sodium carbonate. Now the temperature is lowered to 650° C. and the sodium carbonate containing sodium sulphide is now treated according to Examples 1 or 2 with hydrogen sulphide containing reducing gases in order to obtain a product free from sodium carbonate. The latter product may be also obtained directly by adding a small proportion—for instance ½ or 1%—$H_2S$ to the carbon monoxide by which the mixture was treated.

Example 6

300 g. of sodium sulphate briquettes are gradually heated with water gas which has been previously purified to 700° C. and further reduced at that temperature until the reaction product no more contains any sulphate. The obtained product consists of about 75% $Na_2S$ besides 25% sodium carbonate. This product is then treated according to examples 1, 2 or 3 with hydrogen sulphide containing gases whereby the desired high percentage sodium sulphide is obtained.

The formation of soda may be prevented by adding 1% or 2% $H_2S$ to the reducing gases which are caused to react on the sodium sulphate at 700° C.

Example 7

A gas mixture containing 100 parts of hydrogen and 10 parts of sulphur vapour is conducted at 400° C. over a catalyzer, for instance molybdenum sulphide. A gas containing about 10% hydrogen sulphide is formed thereby which is caused to act at 500° C. on 250 g. of briquettes of sodium carbonate of the size of a pea, by which 60% of the hydrogen sulphide is converted. At the end of the reaction the spent gas has the following composition:

|  | Percent |
|---|---|
| Hydrogen | 82.2 |
| Hydrogen suphide | 3.8 |
| Carbon oxide | 2.8 |
| Carbon dioxide | 2.8 |
| Water vapour | 8.4 |

The so obtained gas mixture is conducted in a second furnace over 170 g. of briquettes of sodium carbonate heated to 625° C. Hereby a spent gas is obtained containing 0.3–0.5% of $H_2S$.

The more the sodium carbonate in both furnaces is converted into sodium sulphide the more the content of $H_2S$ of the spent gases increases, until finally the same proportion of hydrogen sulphide is reached in the spent gases as in the fresh gases. If this takes place the reaction is stopped because then all the sodium carbonate is converted into sodium sulphide. Instead of hydrogen also water gas may be used for reacting with the sulphur vapour.

What I claim is:—

1. Process for preparing substantially pure anhydrous sodium sulphide comprising the steps of reacting on sodium carbonate at a temperature of about 600° C. with a gas mixture containing hydrogen sulphide up to about 15%, the remainder consisting of hydrogen and carbon monoxide in the proportion of about 5 to 2, eliminating from the spent gases up to 90% of the formed carbon dioxide and water vapor, adding fresh hydrogen sulphide up to the original amount and recirculating the so obtained gas mixture until the sodium carbonate is completely converted into normal sodium sulphide.

2. Process for preparing substantially pure anhydrous normal alkali metal sulphide comprising the step of reacting on a mixture of alkali metal sulphide, alkali metal sulphite, alkali metal carbonate and alkali metal hydroxide obtained by reduction of alkali metal sulphate with reducing gases, at a temperature between about 600° C. and about 700° C. with a gas mixture free from detrimental quantities of noxious constituents, containing hydrogen sulphide and a large excess of reducing gas not containing active sulphur while maintaining the mixture of alkali metal compounds in the solid state.

3. Process for preparing substantially pure anhydrous sodium sulphide comprising the step of reacting on a mixture containing about 75% sodium sulphide, about 24% sodium carbonate, and about 1% sodium hydroxide at a temperature of about 600° C. with a gas mixture containing about 5% by volume of carbon oxy sulphide and 95% by volume of hydrogen while maintaining the mixture of alkali metal compounds in the solid state.

4. Process for preparing anhydrous normal sodium sulphide substantially free from polysulphides, hydrosulphides, and cyanogen compounds, comprising the steps of reacting on solid sodium carbonate at a temperature between 500° C. and about 800° C. with a gas mixture free from detrimental and substantial quantities of cyanogen compounds and of carbon dioxide and water vapor, said gas mixture being at the same time such that no substantial amount of carbon is deposited therefrom at the temperature of reaction and containing a volatilized sulphide and at least twice the volume of said volatilized sulfide of a reducing gas of the group comprising hydrogen and carbon monoxide, while maintaining the reaction mass in the solid state, and continuing said reaction until substantially all the sodium carbonate has been converted into normal sodium sulphide.

5. Process according to claim 4, in which the volatilized sulphide is hydrogen sulphide.

6. Process according to claim 4, in which the volatilized sulphide is carbon oxy sulphide.

7. Process for preparing anhydrous normal sodium sulphide substantially free from polysulphides, hydrosulphides and cyanogen compounds, comprising the step of reacting on solid sodium carbonate at a temperature between 500 and about 800° C. with a gas mixture containing nitrogen, hydrogen and at least 2% of hydrogen sulphide, the concentration of the hydrogen being at least twice the concentration of the hydrogen sulphide, said gas mixture being free from detrimental and substantial quantities of cyanogen compounds and of carbon dioxide and water vapor, said gas mixture being at the same time such that no substantial amount of carbon is deposited therefrom at the temperature of reaction while maintaining the reaction mass in the solid state and continuing said reaction until substantially all of the sodium carbonate has been converted into normal sodium sulphide.

8. Process for preparing anhydrous normal sodium sulphide substantially free from polysulphides, hydrosulphides and cyanogen compounds, comprising the steps of reacting on solid sodium carbonate at a temperature between about 500° C. and about 800° C. with a gas mixture containing nitrogen, carbon monoxide, hydrogen and at least 2% of hydrogen sulphide, said gas mixture being free from detrimental and substantial quantities of cyanogen compounds and of carbon dioxide and water vapor, the mixture at the same time being such that no substantial amount of carbon is deposited therefrom at the temperature of reaction and in which the ratio of reducing gas to hydrogen sulphide is more than 2, while maintaining the reacting mass in the solid state, and continuing said reaction until substantially all the sodium carbonate has been converted into normal sodium sulphide.

9. Process for preparing anhydrous normal sodium sulphide substantially free from polysulphides, hydrosulphides and cyanogen compounds, comprising the steps of reacting on solid sodium carbonate at a temperature between about 600° C. and about 800° C. with a gas mixture containing hydrogen, carbon dioxide and at least 2% of hydrogen sulphide, said gas mixture being free from detrimental and substantial quantities of cyanogen compounds and from detrimental quantities of carbon dioxide and water vapor, the mixture at the same time being such that no substantial amount of carbon is deposited therefrom at the temperature of reaction and in which the proportion of hydrogen to hydrogen sulphide is above 2 and the proportion of hydrogen to carbon dioxide is also above 2 while maintaining the reaction mass in the solid state and continuing said reaction until substantially all of the sodium carbonate has been converted into normal sodium sulphide.

10. Process for preparing anhydrous normal sodium sulphide substantially free from polysulphides, hydrosulphides and cyanogen compounds, comprising the steps of reacting on solid sodium carbonate at a temperature between about 600° and about 800° C. with a gas mixture containing reducing gas of the group comprising hydrogen and carbon monoxide, water vapor and at least 2% of hydrogen sulphide, said gas mixture being free from detrimental and substantial quantities of cyanogen compounds and carbon dioxide, the mixture at the same time being such that no substantial amount of carbon is deposited therefrom at the temperature of reaction and in which the proportion of reducing gas to hydrogen sulphide is above 2, and of reducing gas to water vapor is also above 2, while maintaining the reaction mass in the solid state and continuing said reaction until substantially all of the sodium carbonate has been converted into normal sodium sulphide.

11. Process for preparing substantially pure anhydrous normal sodium sulphide, comprising the steps adding hydrogen sulphide to producer gas in such amount that the proportion of carbon monoxide plus hydrogen in the mixture to hydrogen sulphide remains more than 2, reacting the resulting gas mixture with solid sodium carbonate at a temperature between 500°

C. and about 800° C. while maintaining the reaction mass in the solid state and continuing said reaction until substantially all of the sodium carbonate has been converted into normal sodium sulphide.

12. Process for preparing anhydrous normal sodium sulphide substantially free from polysulphides, hydrosulphides and cyanogen compounds, comprising the steps of reacting on solid sodium carbonate at a temperature between about 500° C. and about 800° C. with a gas mixture comprising water gas and more than 2% added hydrogen sulphide, in which the proportion of carbon monoxide plus hydrogen to hydrogen sulphide is above 2, said gas mixture being free from detrimental and substantial quantities of cyanogen compounds, carbon dioxide and water vapor, the mixture being at the same time such that no substantial amount of carbon is deposited therefrom at the temperature of reaction, while maintaining the reaction mass in the solid state, and continuing said reaction until substantially all the sodium carbonate has been converted into normal sodium sulphide.

13. Process for preparing substantially pure anhydrous normal sodium sulphide comprising the steps of reacting on sodium carbonate at a temperature between 500° C. and about 800° C. with a gas mixture free from detrimental quantities of noxious constituents and containing volatilized sulphide and at least twice its volume of reducing gas of the group comprising hydrogen and carbon monoxide, eliminating carbon dioxide and water vapor from the spent gas mixture, adding fresh volatilized sulphide to the treated spent gas mixture, and recirculating the resulting gas mixture until substantially all the sodium carbonate is converted into normal sodium sulphide.

14. Process according to claim 13, in which the quantity of fresh volatilized sulphide added to the spent gases is sufficient to restore the original content of volatilized sulphide of the gas mixture.

HERMANN THEODOR JOSEPH KÖNIG.